United States Patent
Lupke et al.

(10) Patent No.: US 9,969,119 B2
(45) Date of Patent: May 15, 2018

(54) MOLD BLOCK RETURN

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

(*) Notice: Subject to any disclaimer, the term of this patent is extended or adjusted under 35 U.S.C. 154(b) by 0 days. days.

(21) Appl. No.: 15/500,799

(22) PCT Filed: Sep. 30, 2015

(86) PCT No.: PCT/CA2015/000523
§ 371 (c)(1),
(2) Date: Jan. 31, 2017

(87) PCT Pub. No.: WO2016/049747
PCT Pub. Date: Apr. 7, 2016

(65) Prior Publication Data
US 2017/0217080 A1    Aug. 3, 2017

(30) Foreign Application Priority Data
Sep. 30, 2014    (CA) .................................. 2865601

(51) Int. Cl.
   *B29C 53/30*     (2006.01)
   *B29L 23/18*     (2006.01)
   *B29C 47/12*     (2006.01)

(52) U.S. Cl.
   CPC ............ *B29C 53/30* (2013.01); *B29C 47/126* (2013.01); *B29L 2023/18* (2013.01)

(58) Field of Classification Search
   CPC ....... B29C 53/30; B29C 47/126; B29C 47/90; B29L 2023/18

USPC ................................................... 425/233, 336
See application file for complete search history.

(56) References Cited

U.S. PATENT DOCUMENTS

| | | | |
|---|---|---|---|
| 3,981,663 A | 9/1976 | Lupke | |
| 4,021,178 A | 5/1977 | Braun | |
| 4,504,206 A | 3/1985 | Lupke et al. | |
| 4,789,322 A | 12/1988 | Chan et al. | |
| 5,330,600 A | 7/1994 | Lupke | |
| 6,193,496 B1 * | 2/2001 | Dickhut | B29C 33/36 425/233 |
| 8,727,760 B2 * | 5/2014 | Neubauer | B29C 47/0023 425/136 |

OTHER PUBLICATIONS

ISA/CA, International Search Report and Written Opinion for PCT/CA2015/000523, dated Dec. 18, 2015.
ISA/CA, International Preliminary Report on Patentability for PCT/CA2015/000523, dated Nov. 21, 2016.

* cited by examiner

*Primary Examiner* — James P Mackey
(74) *Attorney, Agent, or Firm* — Brion Raffoul

(57) ABSTRACT

A two stage mold block transfer station is used the exit of a moving mold tunnel to quickly move mold blocks to a clear position relative to the molded product. Once in the clear position the mold block is rotated and provided to a return drive moving the mold block back to the inlet of the moving mold tunnel. By moving the last mold block of the moving mold tunnel primarily away from the longitudinal axis of the mold tunnel less mold blocks are required. Various arrangements for moving of the mold blocks can be used achieve this advantage.

10 Claims, 6 Drawing Sheets

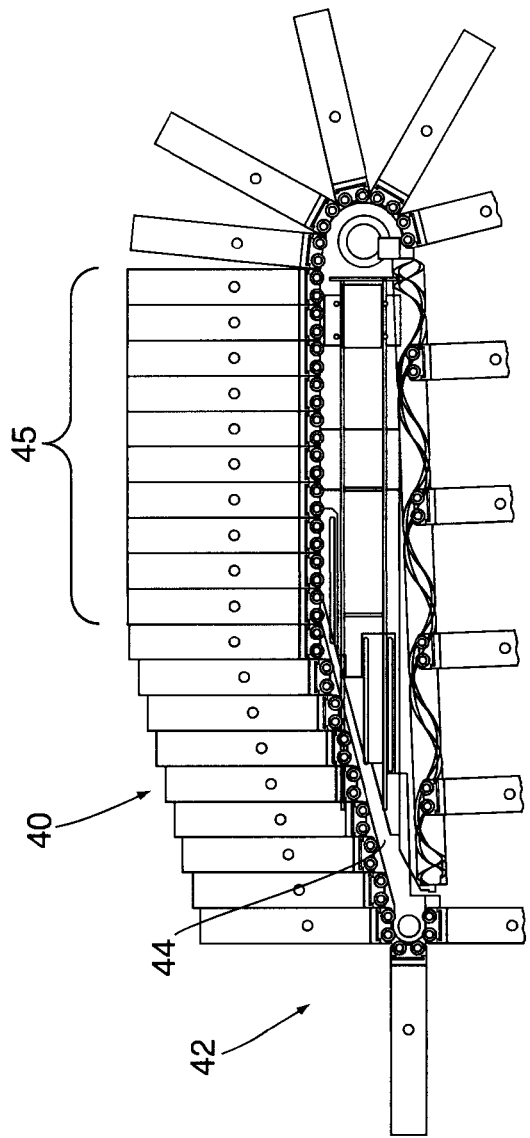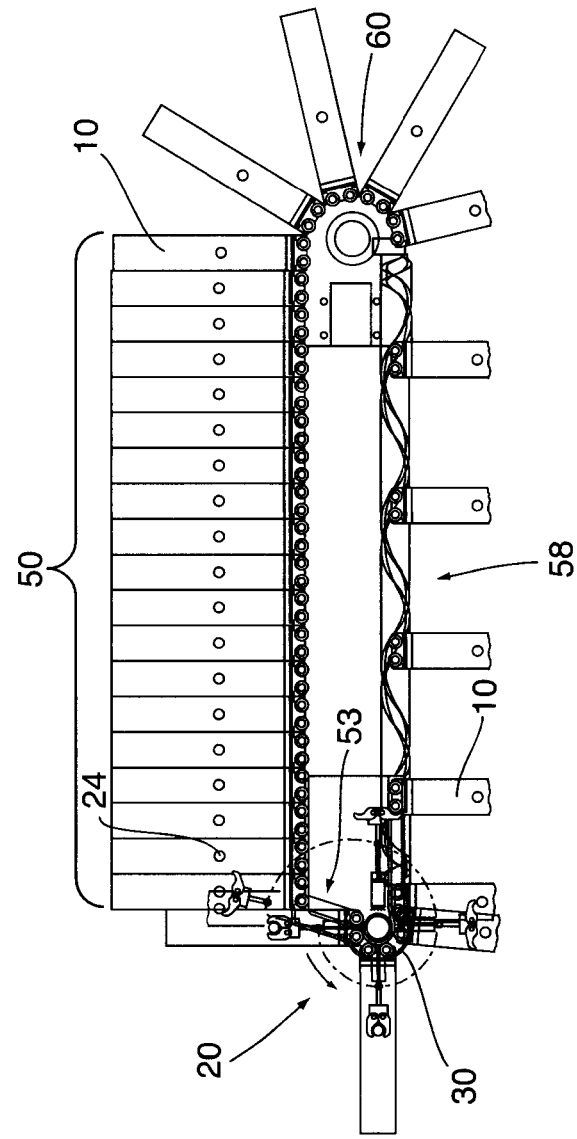
Fig. 3 (Prior Art)
Fig. 4

MOLD BLOCK RETURN

FIELD OF THE INVENTION

The present invention relates to pipe corrugators and in particular to pipe corrugators having opposed series of mold blocks defining a mold tunnel.

BACKGROUND OF THE INVENTION

Well known corrugators use two series of opposed mold blocks which cooperate to define a moving mold tunnel for forming of plastic corrugated pipe. Basically the mold tunnel is aligned with an extruder to receive and shape the molten plastic to form the pipe with the moving mold blocks defining the outer surface of the plastic pipe and cooling the pipe. The series of mold blocks are typically vertically opposed having top and bottom mold blocks or horizontally opposed having left and right mold blocks.

In corrugators of this type, the mold blocks of a first series of mold blocks cooperate with opposed mold blocks of a second series of mold blocks to collectively define the inlet to the moving mold tunnel, the moving mold tunnel and the exit of the moving mold tunnel. The extruded pipe moves with the moving mold tunnel and the mold tunnel is of sufficient length to provide the required time to draw the plastic against the walls of the mold blocks and to partially cool and set the plastic prior to the mold blocks separating at the exit of the moving mold tunnel.

In the manufacture of corrugated pipe, particularly large diameter corrugated pipe, the mold blocks are displaced outwardly away from the longitudinal axis of the moving mold tunnel several times the height of the corrugations of the pipe, before the mold blocks can be rotated to avoid striking any formed corrugations.

Traditional corrugators have a shallow outwardly angled diverging portion at the exit of the moving mold tunnel which provides an angled transition region that progressively separates the adjacent pairs of the mold blocks until the end mold block is sufficiently clear of the formed product that it can be rotated and returned to the inlet of the moving mold tunnel. This angled section slowly moves the mold blocks away from the center line of the mold tunnel over a substantial distance. For example, this angled transition section can be of a length in the range of 5 to 10 mold blocks before sufficient clearance away from the product is obtained and rotation of the mold block can occur.

The present invention is directed to a method and apparatus that provides more effective use of the total number of mold blocks of a mold tunnel relative to the actual time the mold blocks are defining the mold tunnel. With this arrangement less mold blocks are required for a given length of the mold tunnel. The arrangement has particular application with respect to a mold tunnel having opposed mold blocks designed for producing corrugated pipe. On large pipe corrugators, the present arrangement can almost double the molding tunnel using the same number of mold blocks. With this longer molding tunnel the output can be dramatically increased as long as the existing extruder is not running out of capacity. A longer mold tunnel allows a corrugator to run at a higher speed while still forming and sufficiently cooling the molded product.

SUMMARY OF THE INVENTION

The present invention uses a two part drive arrangement adjacent to the exit to the moving mold tunnel that initially primarily displaces the last mold block outwardly with respect to the longitudinal axis of the moving mold tunnel such that the mold block is clear of the product. This first movement is followed by rotation of the mold block for return to a mold block return path.

A separate drive arrangement is used to initially move the mold block away from the longitudinal axis of the moving mold tunnel (generally in a perpendicular direction) such that the mold block is cleared of the molded product including clear of any corrugations. Once clear of the molded product, the mold block is rotated and returned to the return path. In a preferred embodiment of the invention the last mold block of the moving mold tunnel is quickly separated relative to the axis of the mold tunnel and then rotated and returned. With this arrangement the effective length of the moving mold tunnel can be increased and/or the number of mold blocks necessary to define a particular mold tunnel length can be reduced.

In a preferred embodiment a separate drive component is used to engage the last mold block as it is about to be positioned at the end of the moving mold tunnel and the mold block is moved in a direction primarily away from the axis of the moving mold tunnel to a clear position. Once clear the mold block can be rotated approximately 180° and returned to a mold block return path. This movement of the mold blocks requires an additional drive or drive stage that engages the last mold block and imparts a perpendicular movement to the last mold block such that moves in a primary direction to separate from the molded product. This additional drive allows movement of the mold block to a clear position that is not dominated by the longitudinal movement of the mold blocks through the mold tunnel. This additional drive or movement is in contrast to the prior art where a long shallow angled transition is used and the mold blocks continue to push one another until the last mold block is fully separated or clear of the product at which time the last mold block is rotated without interference with the product and returned by a drive arrangement.

With the present invention a mold block drive arrangement is required that provides the two distinct stage separation of the last mold block of the mold tunnel for providing the mold block to a mold block return path. The cost efficiency with respect to the corrugator per length of mold tunnel and/or the number of mold blocks required for a mold tunnel of a particular length justifies the additional cost of the two distinct stage separation of the mold block drive or function.

BRIEF DESCRIPTION OF THE DRAWINGS

Preferred embodiments of the invention are shown in the drawings, wherein:

FIGS. 3 (prior art) and 4 show a comparison of a series of mold blocks of a prior art moving mold tunnel arrangement and the series of mold blocks of the current design;

DETAILED DESCRIPTION OF THE PREFERRED EMBODIMENTS

Figure 1:
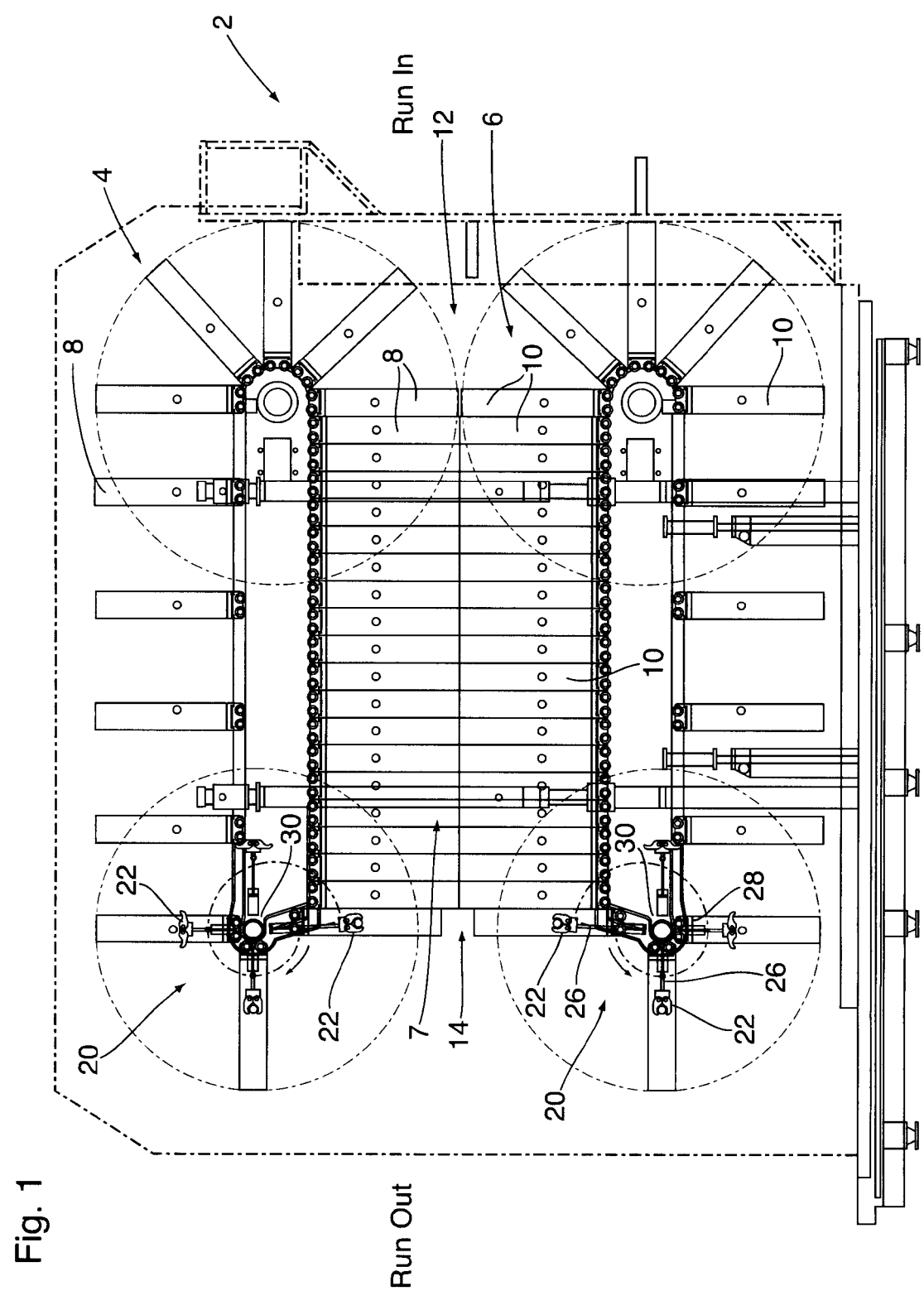
FIG. 1 shows a moving mold tunnel arrangement defined by upper and lower series of mold blocks.

FIG. 1 shows a moving mold block tunnel arrangement 2 comprising a first series of mold blocks 4 and a second series of mold blocks 6. The first series of mold blocks includes individual mold blocks 8 and the second series of mold blocks includes individual mold blocks 10. The mold block tunnel arrangement 2 includes an inlet 12 and an outlet 14 with a moving mold tunnel 7 located therebetween. As can be seen, the outlet 14 is defined by a pair of mold transfer stations 20. Each transfer station 20 includes a series of releasable grippers 22 at one end of extension arms 26 which are controlled by an actuator 28. The actuator 28 quickly moves the one end of the mold blocks into a rotatable drive shown as 30. The rotatable drive rotates the mold blocks for return to the inlet 12 of the moving mold tunnel arrangement.

Figure 2:
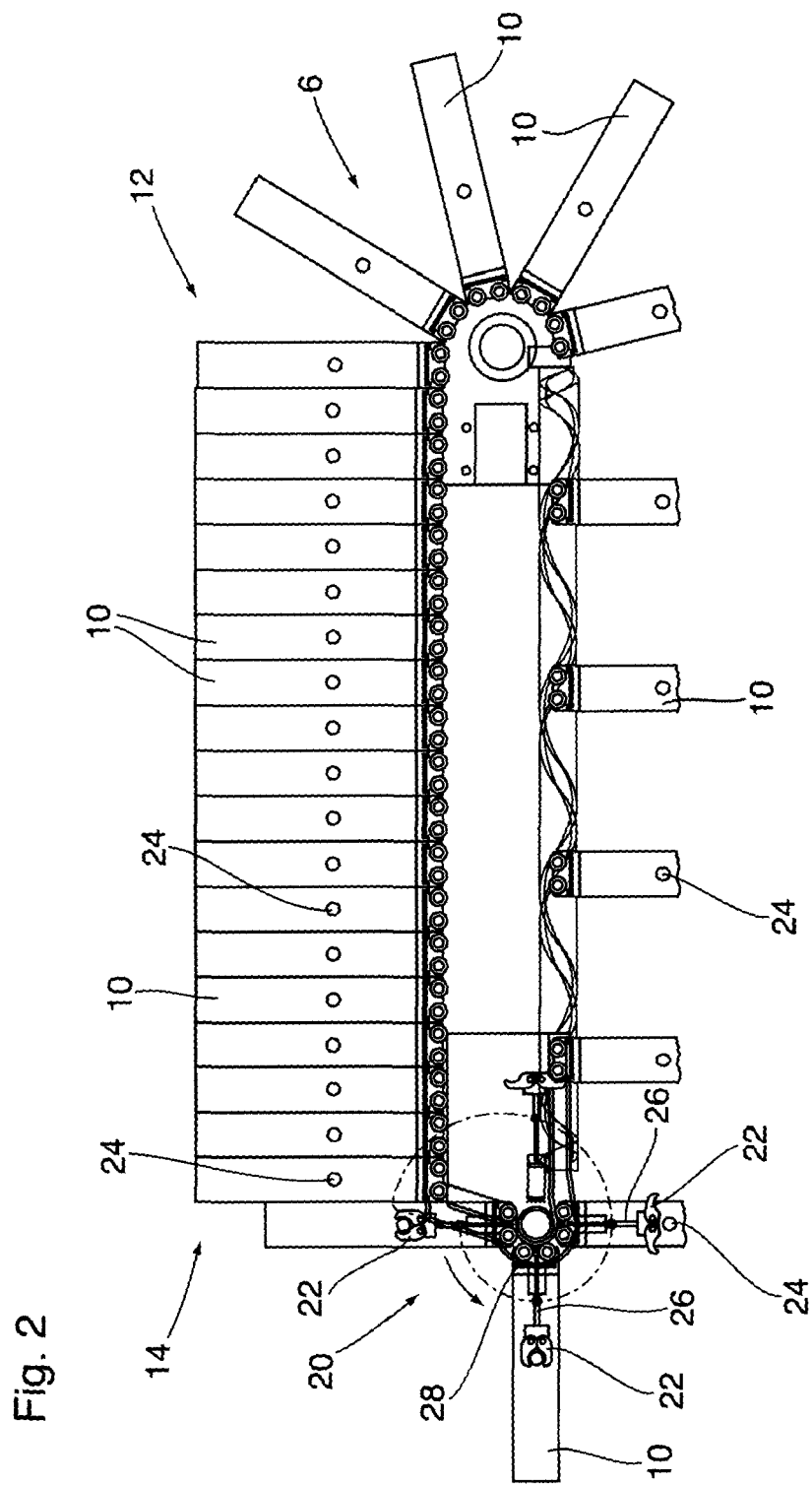
FIG. 2 is a view similar to FIG. 1 showing the lower series of mold blocks with additional details of a transfer station positioned at the exit to the moving mold tunnel.

FIG. 2 shows additional details of the second series of mold blocks 6 which are the same as the first series. For comparison purposes, FIG. 3 shows a series of conventional mold blocks used in combination with a like series of mold blocks for defining a moving mold block tunnel. In the conventional structure there is a large transition portion 40 that is angled and generally identified as 40. The angled transition portion 40 provides for slower progressive movement of the mold blocks to a clear position where the end mold block has sufficiently cleared the molded pipe product that the mold block can be rotated as generally shown at position 42. This angled transition 40 is of a longer length and as illustrated there are 8 mold blocks that are in the transition region 40 and the mold blocks are progressively moved to the clear position over a substantial length of the corrugator.

In contrast, in FIG. 4 the same size corrugator is shown i.e. the corrugator has the same number of mold blocks as the mold tunnel arrangement of FIG. 3, however the length of the molding tunnel 50 is significantly greater than the mold tunnel 45 of the series of mold blocks shown in FIG. 3. Each series of mold blocks includes the same number of mold blocks however in the structure of FIG. 4 the number of mold blocks defining the molding tunnel has been increased relative to the total number of mold blocks of the series of mold blocks. This is accomplished by use of the mold block transfer station 20 that provides an initial generally perpendicular movement of the mold block away from the molded product to clear the molded product such that the mold block can then be quickly rotated and returned to the inlet. In contrast an angled portion 44 provides the movement of the mold blocks through the angled transition 40 and thus there are less mold blocks available for use in defining the molding tunnel.

From a review of FIG. 4 it is evident that the last mold block of the moving mold tunnel is engaged by the transfer station 20 and moved quickly in a direction away from the axis of the molding tunnel. This movement quickly separates the mold block from the molded product a sufficient distance that the mold block is clear of the product and the mold block can then be rotated without striking the formed product. It is not possible to merely rotate the end mold block at the exit of the mold tunnel. The mold block must be moved to a clear position relative to the extruded product prior to rotation.

In the embodiment of FIG. 4 it can be appreciated that the rollers of the mold block are limited by the angled track arrangement 53 and these act as guides bringing the rollers into engagement with the rotatable drive 30. The rotatable drive 30 rotates the received mold blocks and provides the mold blocks to the return path 58 for movement to the inlet of rotatable drive 60.

As illustrated in the drawings the mold transfer stations 20 at the end of the molding tunnel quickly move the mold blocks in a generally perpendicular direction away from the molded product allowing the mold blocks to quickly clear the molded product for subsequent rotation and return to the inlet of the molding tunnel. This arrangement provides effective use of the mold blocks and a lower cost or more effective moving mold tunnel arrangement. The initial movement of the mold block in the mold transfer station 20 is primarily away from the longitudinal axis of the molding tunnel such that the mold block quickly clears the molded product. Once cleared of the molded product, the mold block is then rotated through approximately 180° and returned to the inlet to the molding tunnel using any one of a number of conventional drives. In the embodiment shown the mold transfer stations 20 include a releasable gripper 22 provided at the end of an extended arm 26 that grips a pin 24 or other structure provided on the mold block and the gripper is moved in the perpendicular direction by a suitable actuator 28 causing the mold block to move with it. Once the mold block has been moved to the clear position, a suitable rotating drive 30 imparts the desired rotation of the mold block for return to the inlet.

It is preferred that the last mold block is moved to the clear position within the time required to move the mold tunnel a distance equal to twice the width of a mold block.

The total number of mold blocks in the transfer station 20 is less than 8 and preferably 6 or less. The illustrated embodiment shows 4 mold blocks. It is preferred that each transfer station includes at least four actuators/grippers.

Figure 5:
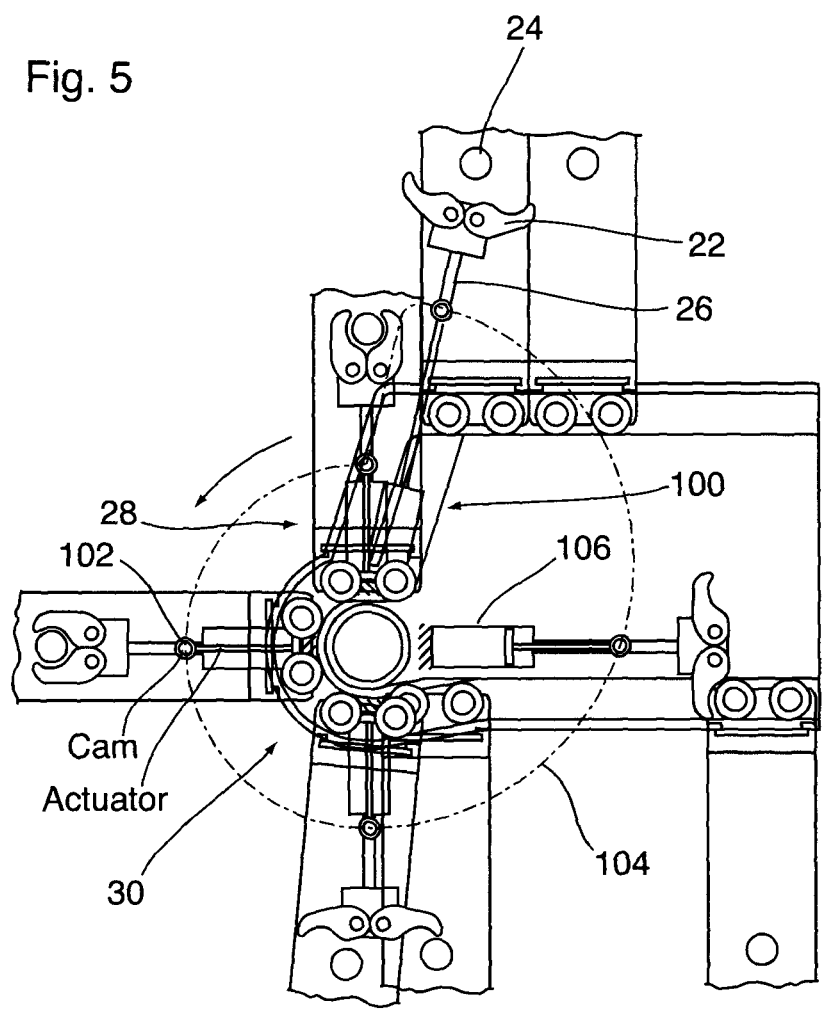
FIG. 5 shows additional details with respect to the engagement of the last mold block of the moving mold tunnel and its movement in a direction away from the longitudinal axis of the mold tunnel.

In the embodiment shown in FIG. 4 each of the mold blocks include on either side thereof a pair of rollers that are movable within a particular channel or trackway. These rollers are maintained in a steep angled portion of the trackway shown as 100 and this angled portion leads to the rotatable drive 30 for engagement of these rollers with the rotatable drive. This angled transition portion 100 effectively controls the position of the drive end of the mold blocks as they are moved through the mold transfer station 20. In the mold transfer station 20, shown in FIGS. 2, 4 and 5 the extending arm 26 includes a cam actuator 102 that follows a cam path 104 shown in dotted lines. This provides a simple mechanism for controlling the actuating arm in combination with its movement within a cylinder-type structure shown as 106.

Figure 6:
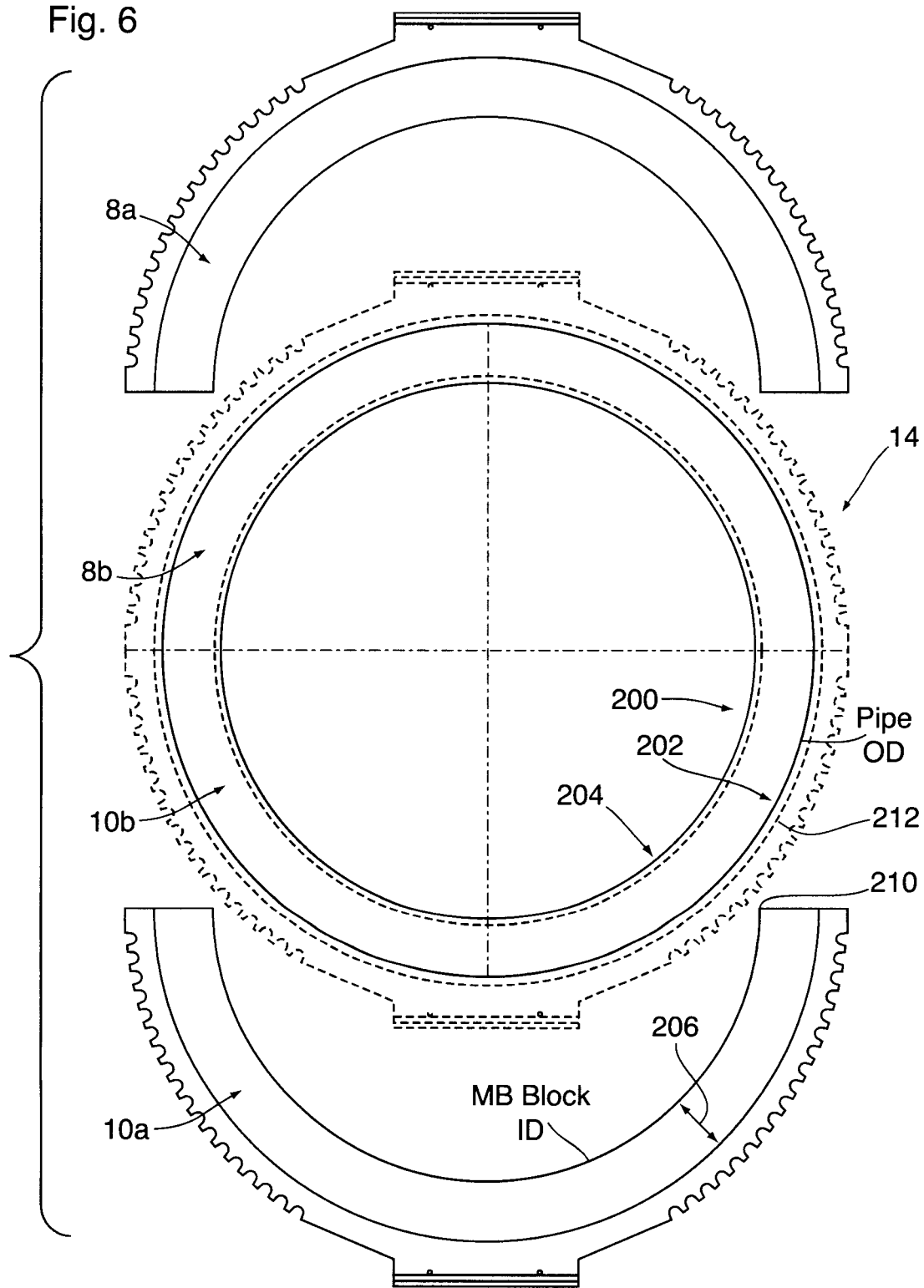
FIG. 6 is an end view at an exit to a mold tunnel illustrating mold blocks displaced outwardly while the following mold blocks are still part of the moving mold tunnel.

The end mold blocks 8a and 10a in FIG. 6 have been displaced outwardly sufficiently to fully separate from the outer periphery of the formed corrugated pipe 200. The corrugated pipe 200 includes an outer wall 202 defining a maximum limit of one of the corrugations with an inner wall 204 defining a base of one of the corrugations.

The depth of the corrugations is shown as 206 in the mold block 10a.

As previously described, each transfer station 20 must displace the last mold block outwardly to a position where the inside wall 210 defining the base of a corrugation is clear of the maximum limit 202 of the adjacent corrugation. Once in a clear position rotation of mold blocks 8a or 10a can occur, allowing faster return to the inlet of the moving mold tunnel. The initial outward displacement of mold blocks 8a and 10a provides additional clearance.

In some applications, the mold blocks can be exchanged for forming different diameters of corrugated pipe and corrugated pipes having greater or smaller corrugations. By providing additional outward displacement of the end mold blocks, the transfer stations can operate with a series of different sizes of mold blocks without any significant changeover. This additional clearance also provides a margin of safety with respect to the formed pipe which is still in a somewhat deformable state and requires further cooling.

Figure 7:
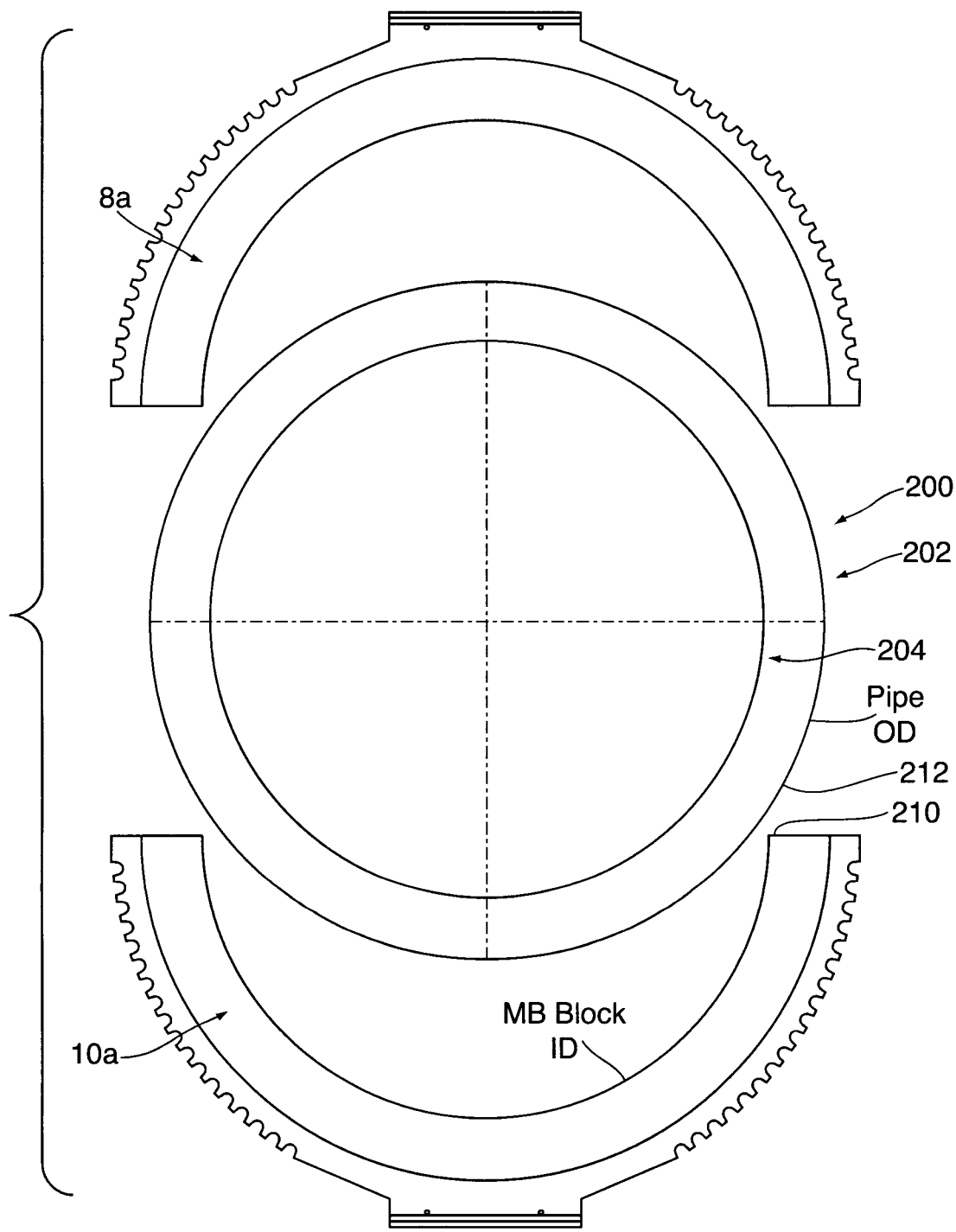
FIG. 7 is an end view showing a formed corrugated pipe and the cleared mold blocks.

FIG. 7 shows a formed corrugated pipe 200 and the cleared mold blocks 8a and 10a.

This type of corrugator is particularly useful in manufacturing corrugated pipe of a diameter in excess of 400 mm. With large diameter corrugated pipe the reduction in the total number of mold blocks possible with this design can be quite significant and the reduction in length can also be an advantage.

The present invention is not limited to the preferred drive arrangement shown in the Figures for engaging the last mold block of the mold tunnel and moving it outwardly and away from the mold axis such that it can be quickly returned. The invention is broader in scope and directed to the principle disclosed in the application, namely that the last mold block of the mold tunnel can be quickly moved away from the molded product to a clear position (preferably in a general perpendicular direction) and then rotated for return to the inlet. Mold blocks leaving the transfer station are returned to the inlet of the moving mold tunnel using any of a number of drive arrangements. The present invention includes the two-step type movement of the mold block where there is a primary movement to initially move the mold block to a clear position with respect to the molded product and then subsequent rotational movement of the mold block for return to the inlet.

The particular transfer station shown in the figures allows for some movement of the mold block in the direction of the longitudinal axis of the molding tunnel or the molded product as the mold block is primarily moved away from the axis of the molding tunnel. The primary movement of the mold block to a clear position allows rotation of the mold block to be accomplished within 1 or 2 mold block widths of the exit of the molding tunnel. The efficiency of the moving mold tunnel arrangement is improved as the number of mold blocks per length of molding tunnel has been reduced. Other arrangements for effectively moving of the mold block quickly to a clear position followed by rotation of the mold block can be used and the present invention is not limited to the particular structure shown in the figures. Other transfer stations that provide this required movement of the mold block are all included within the subject matter of the invention.

Although various preferred embodiments of the present invention have been described herein in detail, it will be appreciated by those skilled in the art, that variations may be made thereto without departing from the invention as claimed.

The embodiments of the invention in which an exclusive property or privilege is claimed are defined as follows:

1. In a pipe corrugator for forming a pipe, said corrugator having opposed series of mold blocks that come together at an inlet and are driven by a primary drive to form a moving mold tunnel with said mold blocks separating at an exit of said moving mold tunnel, the improvement comprising each series of mold blocks including a mold block transfer station controlling separation of said mold blocks at said exit of said moving mold tunnel; said mold block transfer station having a first drive mechanism and a second drive mechanism for moving a last block of said moving mold tunnel at said exit of said moving mold tunnel;

said first drive mechanism engaging the last mold block and primarily displacing the last mold block in a direction generally perpendicular to a longitudinal axis of the moving mold tunnel to a clear position where a mold cavity of the last mold block has moved sufficiently to clear the formed pipe and said last mold block is subsequently rotated by a second drive mechanism of the respective mold transfer station for return to the inlet of said moving mold tunnel.

2. In a pipe corrugator according to claim 1, wherein said first drive mechanism moves said last mold block to said clear position within a time period corresponding to the time required to move a mold block of said moving mold tunnel a distance equal to the width of the mold block.

3. In a pipe corrugator according to claim 1, wherein said first drive mechanism includes a plurality of actuators for engaging a transfer pin provided on each mold block and moving an engaged mold block in mold block to said clear position; and wherein each actuator includes a gripper and an actuating arm.

4. In a pipe corrugator according to claim 3, wherein said first drive mechanism is connected to and rotates with said second drive mechanism.

5. In a pipe corrugator according to claim 3, wherein said plurality of actuators of said first drive mechanism includes at least four actuators.

6. In a pipe corrugator according to claim 1, wherein a maximum number of mold blocks at any one time in said first drive mechanism and said second drive mechanism is less than 8 mold blocks.

7. In a pipe corrugator according to claim 1, wherein a maximum number of mold blocks at any one time in said first drive mechanism and said second drive mechanism is 4 or less.

8. In a pipe corrugator having a moving mold tunnel defined by abutting mold blocks of synchronously driven first and second series of mold blocks, a method of disengaging at an exit to the moving mold tunnel mold blocks by use of first and second drive mechanisms, said first drive mechanism engaging and displacing the last mold blocks of the moving mold tunnel in a generally perpendicular direction away from a longitudinal axis of the moving mold tunnel as the moving mold tunnel moves through a distance of less than twice the width of a mold block to position the displaced mold blocks in a clear position away from the longitudinal axis and subsequently using said second drive mechanism to rotate and provide the displaced mold blocks to mold block return drive feeding mold blocks to the inlet of the mold tunnel.

9. In a pipe corrugator according to claim 8, including limiting a number of mold blocks between the exit of the mold tunnel defined by a separating last mold block and a position where mold blocks are provided to the mold block return drive to less than 8 mold blocks.

10. In a pipe corrugator according to claim 8, including limiting a number of mold blocks between the last mold block at the exit of the moving mold tunnel and a position where mold blocks are provided to the mold block return drive to 4 mold blocks with respect to each series of mold blocks.

* * * * *